Patented Dec. 19, 1950

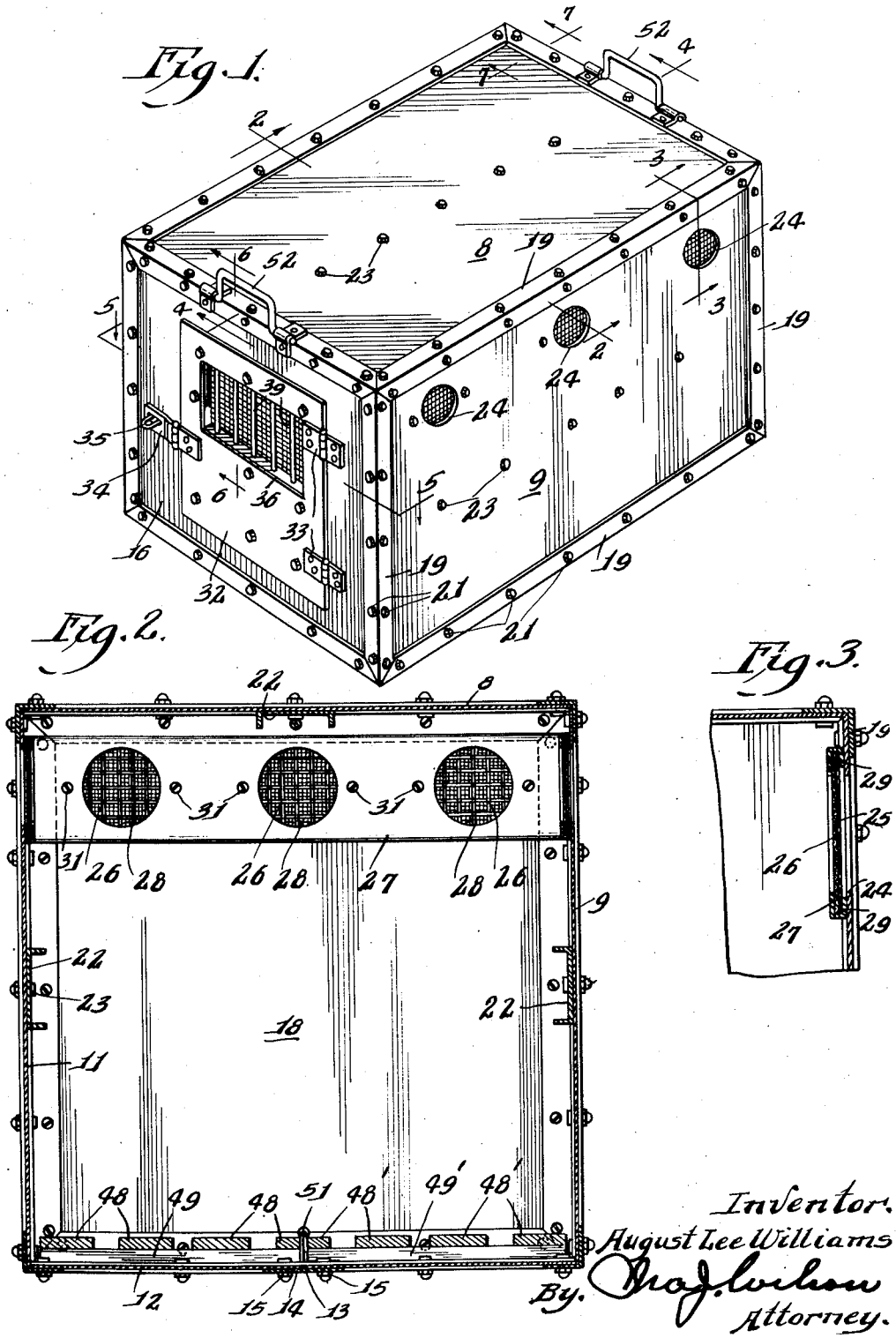
Dec. 19, 1950 — A. L. WILLIAMS — 2,534,492
ANIMAL SHIPPING CRATE
Filed April 8, 1948 — 2 Sheets-Sheet 1
Inventor.
August Lee Williams Dec. 19, 1950   A. L. WILLIAMS   2,534,492
ANIMAL SHIPPING CRATE
Filed April 8, 1948   2 Sheets-Sheet 2
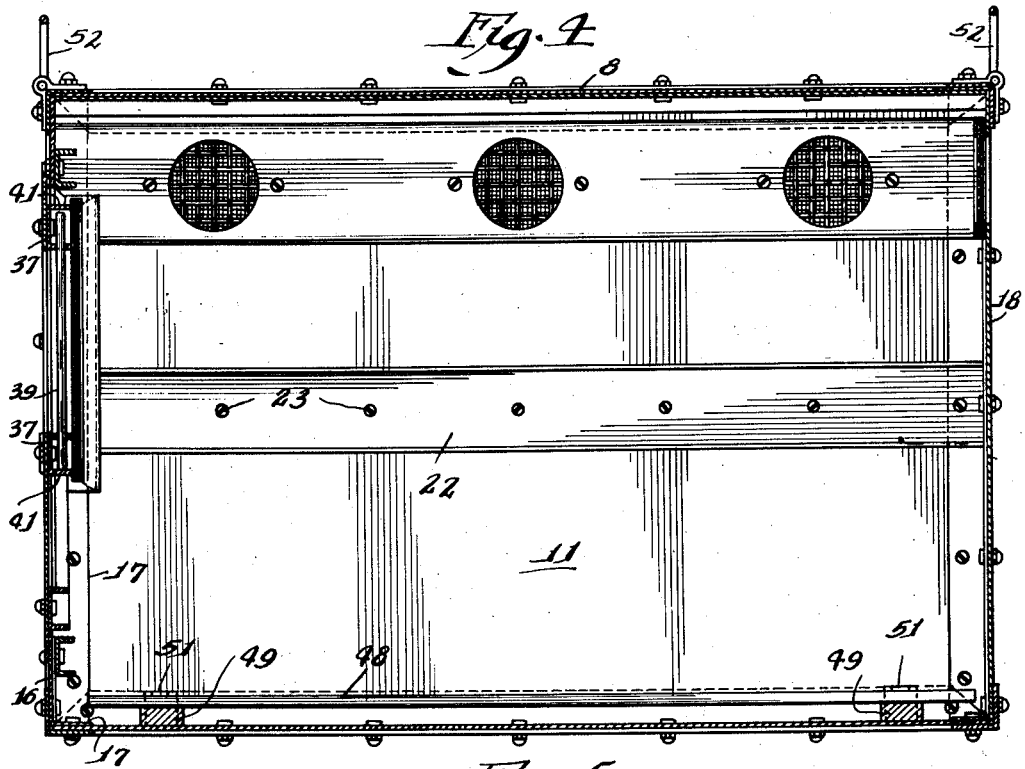
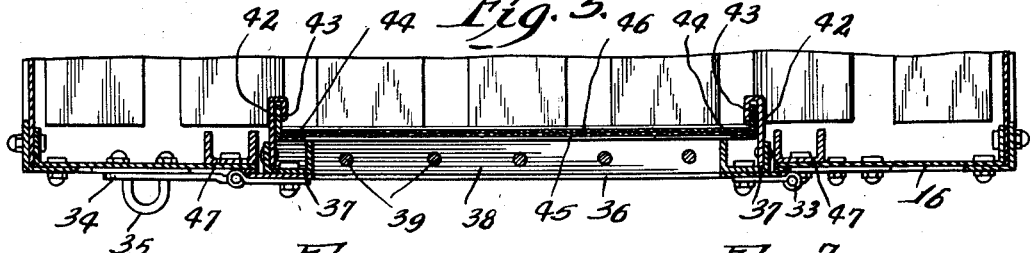
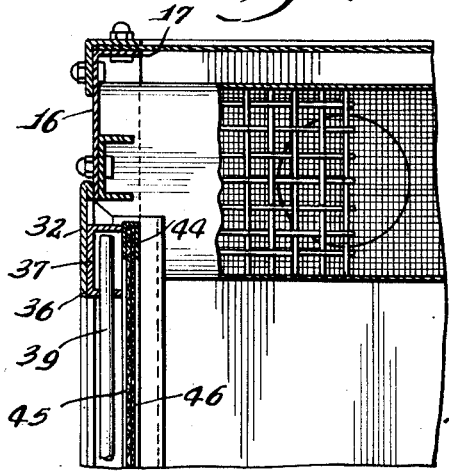
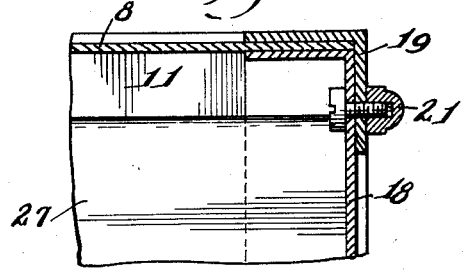
Inventor.
August Lee Williams.
By
Attorney.

2,534,492

UNITED STATES PATENT OFFICE 2,534,492

ANIMAL SHIPPING CRATE

August Lee Williams, Chicago, Ill.

Application April 8, 1948, Serial No. 19,793

5 Claims. (Cl. 119—19)

The invention pertains to shipping crates or containers for animals, and, more particularly, to crates or carriers especially suitable for the transportation of the smaller animals such as dogs, cats, etc.

The primary object of the invention is to provide a strong, durable and comfortable crate or container which will not only protect the animal placed in it from bodily injury and the attacks of insects during shipment, as well as from the attentions of unauthorized persons, but also one from which the animal may not escape nor yet attack anyone or anything. Included in this objective is the provision of a housing which will be light enough to permit ease, convenience and economy of handling in transit, which will give the animal as much comfort as is possible in the confinement required for shipment, and which will have a long life even under strenuous and adverse conditions of use.

Many other objects as well as the advantages and uses of the invention will be or should become apparent after reading the following description of a presently preferred embodiment, after reading the appended claims and after viewing the drawings in which:

Fig. 1 is an isometric view of the presently preferred embodiment of the invention, showing the crate as it appears ready for use;

Fig. 2 is a transverse sectional view taken substantially along the line 2—2 of Fig. 1;

Fig. 3 is a section of a fragment taken substantially along section line 3—3 of Fig. 1;

Fig. 4 is a longitudinal sectional view taken substantially along the line 4—4 of Fig. 1;

Fig. 5 is a horizontal section of a fragment of the front end of the crate taken substantially along the section line 5—5 of Fig. 1;

Fig. 6 is a vertical section of a fragment of the front of the crate taken substantially along the section line 6—6 of Fig. 1; and Fig. 7 is a section of a corner fragment taken substantially along section line 7—7 of Fig. 1.

Part of the strength and security of the crate illustrated results from the manufacture of the top wall 8 side walls 9 and 11 and bottom wall 12 from a single sheet of sheet metal, preferably aluminum, magnesium or an alloy of one of these metals, the ends of the sheet preferably being brought together in substantially abutting relation along the center of the bottom wall as indicated at 13 in Fig. 2; a sheet metal strip 14 riveted, bolted or welded to the respective abutting edges of the sheet along and over the joint 13 secures these edges firmly in position. Here as elsewhere in the structure, bolts 15 are illustrated as the securing means for fastening the strip 14 over the abutting ends of the sheet along the bottom wall but it should be understood that these and other parts may be secured together by welding or riveting if such expedients are preferred.

The front wall 16 is similarly constructed from light sheet metal and has inwardly turned edges providing flanges 17 extending perimetrically thereabout for underlapping the front end edges of the top, side and bottom walls. The rear wall 18 also is formed of light sheet metal and has perimeter flanges adapted, after the manner of the front wall, to underlap the rear end edges of the top, side and bottom walls. In other words, the front and rear walls have flanges which telescope within the ends of the container and thereby serve to strengthen both the end walls and the side, top and bottom walls at the ends.

Along each juncture of two walls, that is, along each corner edge formed by the juncture of one wall with another, is an L-shaped or angle shaped light sheet metal reinforcing such as indicated at 19 which may be secured to the top, side, bottom and end walls, as the case may be, by a plurality of bolts 21 arranged at spaced intervals on each side of the juncture between the walls. As indicated above rivets or welds may be substituted for the bolts 21. At the juncture of the top, side and bottom walls at each end the bolts or other securing means 21 not only pass through the angle reinforcing strips and the adjacent wall, but also through the flanges 17, thereby simultaneously to secure the end walls to the adjacent walls and to the reinforcing angle corner strips. This provides a very strong and relatively rigid structure. Extending lengthwise centrally of the side and top walls at the inside surface of each is a channel member 22 formed of light sheet metal and secured at spaced intervals lengthwise by bolts 23 located at spaced intervals throughout the length of these channel members. Preferably the channel members 22 extend from end wall to end wall and serve to effect strong reinforcement of each wall to which attached.

In order to provide adequate ventilation for the animal in the crate the side and rear end walls 9, 11 and 18, respectively, are provided with apertures 24 here shown of circular shape, but which may be of any desired configuration. Each aperture is screened with both fine mesh screening 25, such as the ordinary fly screen, to keep out insects and the like, and with coarse heavy mesh screening 26 to prevent injury to the fine mesh screen, the coarse being placed to the inside of the fine mesh screen since there is more likelihood of injury to the latter by reason of the animal scratching than there is from external forces. Conveniently, a sheet metal strip 27 having apertures 28 adapted to register with the apertures 24 serves as a screen carrier, to this end having its longitudinal margins turned in as indicated at 29 against a length or lengths of screening, thereby to clamp the screening in place. Bolts or other securing means 21 secure the strips 27 in place and firmly to the sides and rear end walls. The screen itself may be cut in one length extending the full distance from one end of the wall to the other, or it may be more economical to cut the screen into shorter lengths of a width sufficient of course to cover each aperture.

Cross ventilation is established between the end walls through the apertures 24, 28 in the rear wall, and a screened and barred opening in a door in the front wall. The door 32 is constructed from sheet metal and provided with hinges 33 which may be riveted or otherwise secured thereto and to the wall 16. A hinged hasp 34 secured to the door and a staple 35 secured to the wall 16 and a padlock (not shown) provide one means by which the door may be secured against unauthorized opening. In the upper portion of the door is a rectangular aperture 36, the margins of which are reinforced by sheet metal channels 37 bolted, riveted or welded to the door sheet 32. Along the upper edge and the bottom edge of the opening 36 those side flanges 38, of the channels 37, are perforated or drilled for the passage of the ends of rigid steel or other metal bars 39 arranged in parallel spaced relation vertically across the opening 36. The ends of these bars 39 extend into contact with or into close proximity to those flanges 41 of the channels 37 which are farthest from the margin of the opening 36, and when the top and bottom channels 37 are secured to the door, the bars are fixed firmly in position.

The door opening 36 must also be screened for the same reason that the apertures 24 were screened, but in this case it is preferable to have the screen readily removable. To this end channel guide members 42 extending parallel to one another at opposite sides of the opening 36 and suitably secured to those flanges of channels 37 which are the farthest or most remote from the door opening, are arranged to receive flanges 43 forming the side edges of a frame 44 in which a compound screen including a fine mesh screen 45 and a coarse mesh screen 46, is secured. When the door is opened the screen may be raised or removed by sliding the screen upwardly in the channels 42. A suitable stop may be secured to the bottoms of the channels 42 or otherwise to prevent the screen from dropping below a predetermined position. The opening in the end wall for the door may be suitably framed on all four sides of the door by channel members 47 secured by bolts, rivets or welding after the manner previously described.

In order to protect the animal from debris accumulating on the floor of the crate a slat floor, removable through the door opening, has been provided. This slat floor consists of two sets of longitudinally extending slats 48 and 48', one set being secured to a pair of sleepers 49 and the other to a pair of sleepers 49'. The two sets are hinged together by hinges 51 so that they may be swung upwardly together or in face to face relationship and then removed through the open door. A carrying handle 52 at each end of the top of the crate and suitably secured as by rivets or otherwise, permits the crate to be handled very easily.

It will be apparent from the foregoing that I have provided an exceptionally strong and durable crate or cage particularly valuable for shipping animals. The crate affords protection from flies and other insects, prevents unauthorized persons from feeding or annoying the animal within the crate, and affords protection from accidental injury to the animal therein. The slat floor will prevent the animal from lying or standing in debris and is easily removed for cleaning.

Since various changes and rearrangements of parts may be made without departing from the invention spirit I desire to be limited only by the scope of the appended claims.

1. A shipping crate for animals comprising a generally rectangular container having light sheet metal top, bottom, side and end walls, the top, side and bottom walls being formed from a single sheet of such metal with one pair of the opposite edges of the sheet secured together in abutting relation, light sheet metal L-shaped reinforcing elements extending along and from end to end of each corner edge of the container and secured to each of the adjacent walls at spaced intervals therealong, a channel shaped reinforcing element disposed against and secured to the inside surface of each of the side and top walls and extending substantially from end to end thereof intermediate of the opposite longitudinal edges of the walls, one of said end walls having a doorway therein, a door for closing said doorway, and a screened opening in the end wall opposite to said door and the said side walls.

2. A shipping crate for animals comprising a generally rectangular container having light sheet metal top, bottom, side and end walls, light sheet metal L-shaped reinforcing elements extending along and from end to end of each corner edge at the juncture of each two walls of the container and secured to each of the adjacent walls at spaced intervals therealong, a channel shaped reinforcing element disposed with the bottom of the channel against and secured to the inside surface of each of the side and top walls and extending substantially from end to end thereof intermediate of the opposite longitudinal edges of the walls, one of said end walls having a doorway therein, a door hinged to said end wall for closing said doorway, and a plurality of screened openings in the upper portions of each of said side walls.

3. A shipping crate for animals comprising a generally rectangular container having light sheet metal top, bottom, side and end walls, the top, side and bottom walls being formed from a single sheet of such metal with the edges of the sheet secured together in abutting relation, light sheet metal L-shaped reinforcing elements extending along and from end to end of each corner edge of the container and secured to each of the adjacent walls at spaced intervals therealong, a channel shaped reinforcing element disposed against and secured to the inside surface of each of the side and top walls and extending substantially from end to end thereof intermediate of the opposite longitudinal edges of the walls, one of said end walls having a doorway therein, a door for closing said doorway, a screened opening in each of the said side walls, and a folding slat platform overlying said bottom wall within the container, said platform being removable through the doorway.

4. In an animal shipping crate as defined in claim 1, in which each of the side wall ventilation openings is covered at the inside of the wall by a layer of fine mesh screening and a layer of coarse mesh screening thereover on the inside surface thereof, and a strip of light sheet metal is disposed over and against the inside surface of the coarse mesh screening and is secured to said side wall whereby to clamp the screening between said strip and side wall, said strip having an opening in register with the side wall opening.

5. A shipping crate for animals comprising a generally rectangular container having light sheet metal top, bottom, side and end walls, the top, side and bottom walls being formed from a single sheet of such metal with the edges of the sheet secured together in abutting relation, light sheet metal L-shaped reinforcing elements extending along and from end to end of each corner edge of the container and secured to each of the adjacent walls at spaced intervals therealong, a channel shaped reinforcing element disposed against and secured to the inside surface of each of the side and top walls and extending substantially from end to end thereof intermediate of the opposite longitudinal edges of the walls, one of said end walls having a doorway therein, a door for closing said doorway, each of the end walls opposite to said door and the said side walls having a screened opening, and a slat flooring supported by and disposed over and in spaced relation to said bottom wall.

AUGUST LEE WILLIAMS.

REFERENCES CITED

The following references are of record in the file of this patent:

UNITED STATES PATENTS

| Number | Name | Date |
|---|---|---|
| 880,846 | Wentworth | Mar. 3, 1908 |
| 944,918 | Selzer | Dec. 28, 1909 |
| 1,010,269 | Klocke | Nov. 28, 1911 |
| 1,047,561 | Petersen | Dec. 17, 1912 |
| 1,283,131 | Fitzpatrick | Oct. 19, 1918 |
| 1,599,446 | Wege | Sept. 14, 1926 |
| 1,619,895 | Tarman | Mar. 8, 1927 |
| 1,784,187 | Imler | Dec. 9, 1930 |
| 2,070,812 | Snead | Feb. 16, 1937 |